United States Patent [19]
Grabher et al.

[11] 3,817,541
[45] June 18, 1974

[54] HOLDER MECHANISM EQUIPPED WITH A TOOL HOLDER RETAINED THEREIN

[75] Inventors: Erich Grabher, Dietlikon, Switzerland; Anton Donhauser, Hohentengen, Germany

[73] Assignee: Werkzeugmaschinenfabrik Oerlikon-Buhrle AG, Zurich, Switzerland

[22] Filed: Sept. 25, 1972

[21] Appl. No.: 291,540

[30] Foreign Application Priority Data
Oct. 1, 1971  Switzerland.................... 14326/71

[52] U.S. Cl.................. 279/1 R, 279/1 TS, 29/568, 198/179
[51] Int. Cl............................................ B23b 31/04
[58] Field of Search........ 279/1 T, 1 S, 1 R; 29/568; 198/179

[56] References Cited
UNITED STATES PATENTS

| | | | |
|---|---|---|---|
| 3,073,024 | 1/1963 | Hutchens et al. | 29/568 |
| 3,414,967 | 12/1968 | Erikson | 29/568 |
| 3,431,635 | 3/1969 | Balding | 29/568 |
| 3,473,419 | 10/1969 | Ollearo | 29/568 |

*Primary Examiner*—Leonidas Vlachos
*Attorney, Agent, or Firm*—Werner W. Kleeman

[57] ABSTRACT

A holder mechanism with a tool holder retained therein and comprising a carrier arranged at stops against which there is displaceable transverse to its axis the tool holder. A locking element is displaceably arranged at the carrier in axial direction of the tool holder for locking the tool holder displaced against the stops.

4 Claims, 3 Drawing Figures

3,817,541

3,817,541

HOLDER MECHANISM EQUIPPED WITH A TOOL HOLDER RETAINED THEREIN

BACKGROUND OF THE INVENTION

The present invention relates to a new and improved construction of holder mechanism equipped with a tool holder retained therein and comprising a carrier or support.

A known holder mechanism of this type possesses a carrier having a bore corresponding to the cylindrical or conical portion of the tool holder. The tool holder can be axially introduced into the bore and secured by ball locks. During mounting and removal of the tool change mechanism engaging with the tool holder, apart from carrying out the pivotal movement which is necessary in each case, there additionally must be carried out an appropriate axial stroke, which unfavorably influences the time for the tool change operation and complicates the path of movement of the tool change mechanism.

A further known holder mechanism of this type, as exemplified for instance by French Pat. No. 2,103,582, possesses a carrier with two U-shaped forks which are arranged in parallel spaced relationship with respect to one another, between which there is introduced the tool holder with its flange. Both of the forks thus cover the flange over one-half of its periphery and the flange, during its transverse axial insertion thereof, arrives with one-half of its periphery at a semi-circular shaped groove base and impacts thereagainst. At the flange there is provided a circular-shaped milled slot with which engages a locking element with its bolt head. This locking element is displaceable parallel to the axis of the tool holder under spring force and thus presses the tool holder against the lower U-shaped fork and secures such against lateral shifting. The drawback of this prior art apparatus resides in the fact that the flange portion at the side of the tool is covered by the upper fork and there is thus prevented the attachment of tools having a large diameter. Furthermore, the tool holder must be delivered to the holder in a very precise position so that the bolt head can engage with the slotted recess; a self-centering action of the tool holder at the carrier does not occur.

SUMMARY OF THE INVENTION

Hence, it is a primary object of the present invention to provide an improved holder mechanism for a tool holder retained therein which effectively and reliably fulfills the existing need in the art and is not associated with the aforementioned drawbacks and limitations of the prior art proposals.

Another and more specific object of the present invention aims at improving a holder mechanism of the previously mentioned type in such a manner that exchange of the tool holder can be carried out more simply and quickly.

Now in order to implement these and still further objects of the invention, which will become more readily apparent as the description proceeds, the invention contemplates arranging stops at the carrier against which there is displaced the tool holder transverse to its axis. There is also provided a locking element arranged to be displaceable at the carrier in the axial direction of the tool holder for locking the tool holder displaced against the stops.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
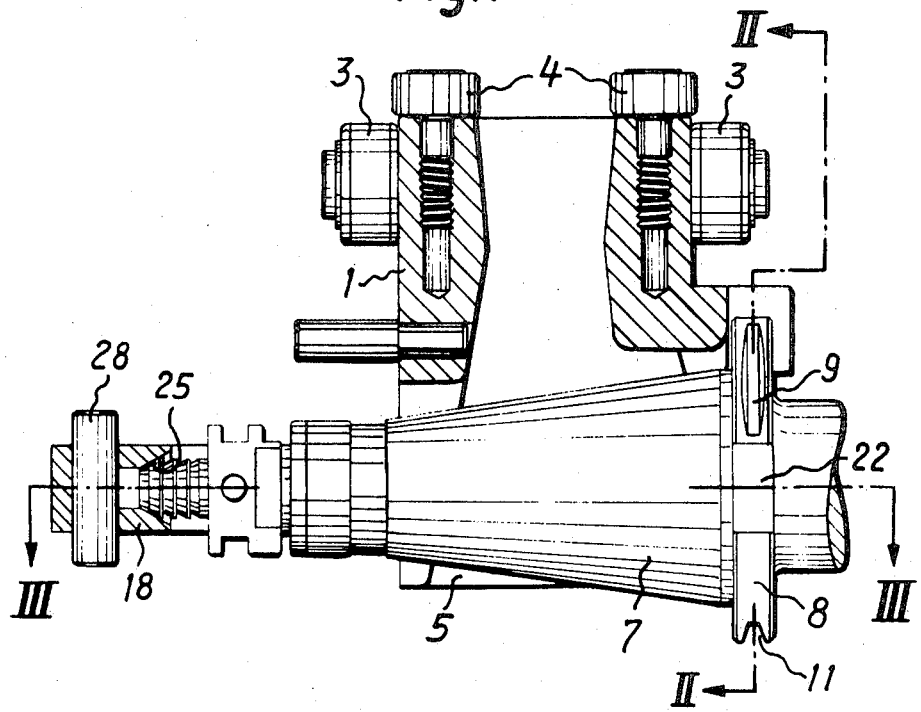
FIG. 1 is a side view, partially in section, of an embodiment of holder mechanism designed according to the teachings of the present invention.
Figure 2:
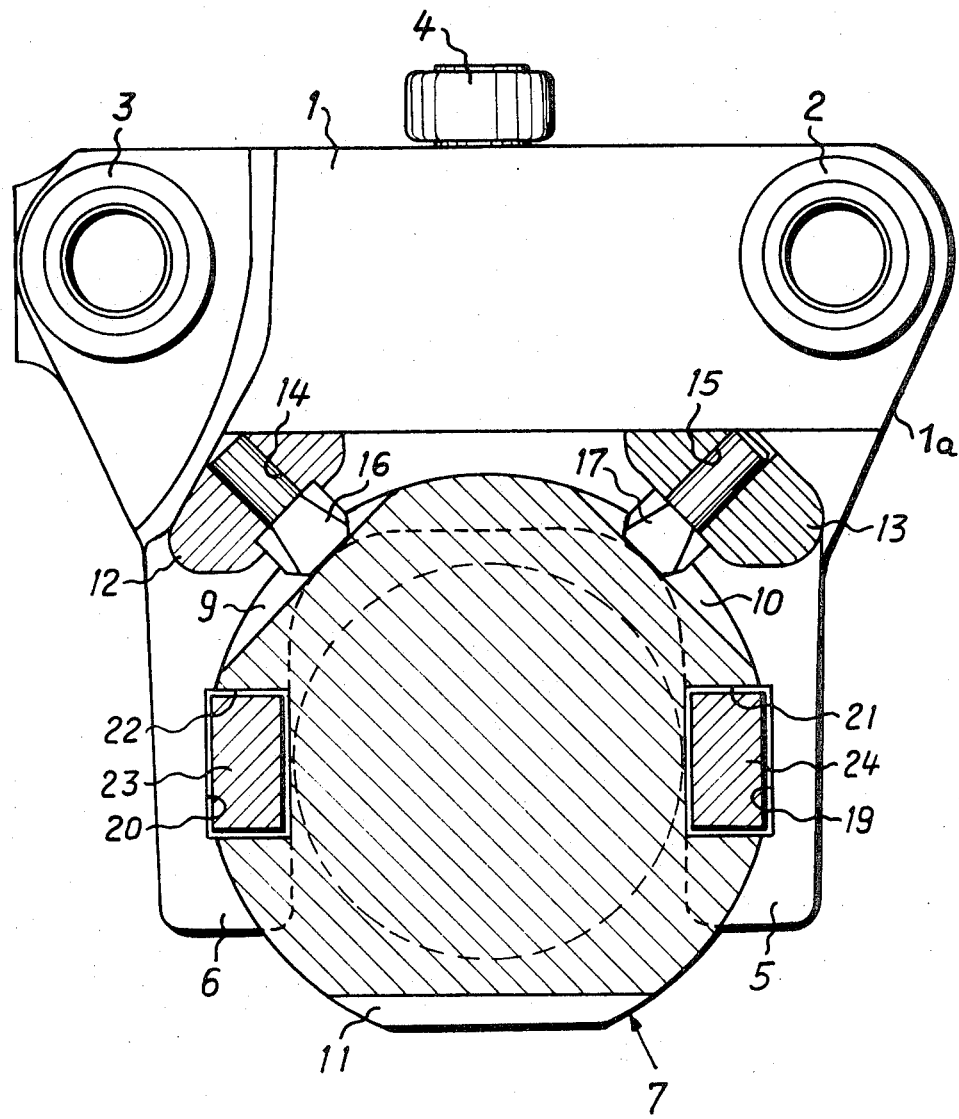
FIG. 2 is a front view of the holder mechanism depicted in FIG. 1, partially in section, taken substantially along the line II—II of FIG. 1.

Describing now the drawings, according to the embodiment of holder mechanism depicted in FIGS. 1 and 2, such will be seen to embody a carrier or support 1. The carrier 1 is guided by means of two pairs of rollers 2, 3 in non-illustrated rails of a magazine, wherein a multiplicity of the illustrated carriers 1 are assembled or combined into a chain. A further pair of rollers 4 serves for the lateral guiding of the carrier 1 at the magazine. The carrier or support 1 is downwardly open in the form of a substantially U-shaped configuration. By means of two legs 5 and 6 of its U-shaped housing 1a this carrier 1 engages about a tool holder 7. This tool holder 7 possesses a flange 8. At the periphery of the flange 8 there are cut or otherwise machined grooves 9, 10 and 11, which are directed tangentially to the flange 8 and perpendicular to the axis of the tool holder 7, and the respective base of which grooves bear against the sides of an equilateral triangle. Two grooves 9, 10, of the aforementioned grooves enclose with one another a right angle. The carrier 1 possesses to both sides two forwardly protruding shoulders or projections 12 and 13 which are provided with bores 14 and 15 respectively, enclosing a right angle and directed perpendicular to the axis of the tool holder 7. Cams 16 and 17 are respectively secured in the bores 14 and 15, these cams, during the lateral introduction from below of the tool holder 7 into the carrier 1 engaging with the grooves 9, 10 at the flange 8 thereof. The grooves 9, 10 therefore form together with the cams 16, 17 cooperating stops. The tool holder 7 is also thereby retained against axial displacement.

Figure 3:
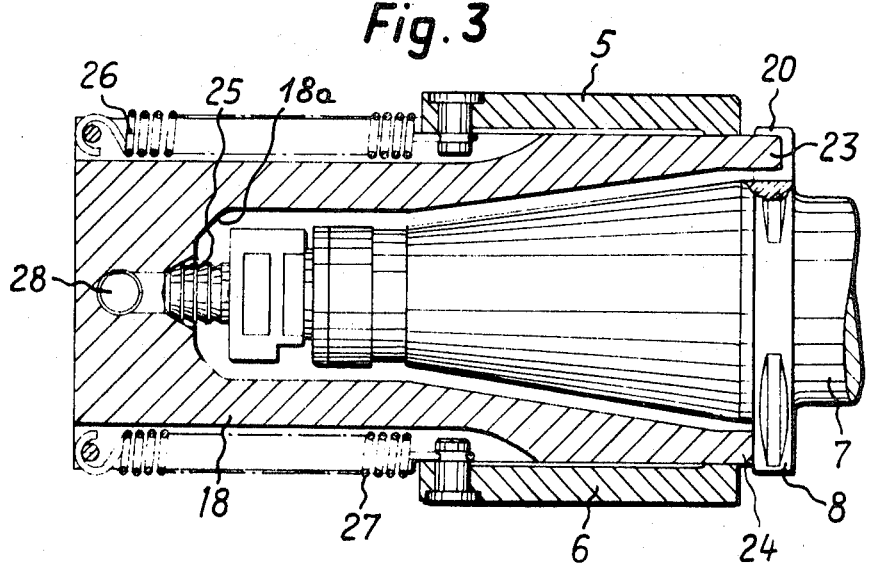
FIG. 3 is a sectional view of the holder mechanism depicted in FIG. 1, taken substantially along the line III—III thereof.

For further fixing the tool holder 7 at the carrier 1 there is provided according to the showing of FIGS. 1 and 2, and particularly FIG. 3, a slide or slide member 18 as a further locking element at the carrier 1 which is displaceably guided in axial direction of the tool holder 7. For this purpose, there are cut or otherwise machined at the legs 5 and 6 of the carrier 1 rectangular-shaped grooves 19, 20 (FIG. 2). The plane of symmetry of the grooves 19, 20 is disposed perpendicular to the plane of symmetry of the carrier 1 and coincides with the plane of symmetry of two diametrically oppositely situated recesses 21 and 22 arranged at the flange 8 of the tool holder 7.

The slide 18 is designed as a flat body member, the height of which is accommodated to the width of the recesses 21, 22 in order to be introduced into such recesses. The slide 18 is furthermore cut or otherwise machined so as to possess an essentially U-shaped configuration in order to be able to introduce the tool holder 7 from the side. With the ends of the legs 23 and 24, which are formed in this manner, the slide engages with the recesses 21, 22 at the flange 8 of the tool holder 7. At the base 18a of the U-shaped cutout or recessed portion at the slide 18, there is arranged a conical-shaped countersunk bore 25 which is in engagement with the rear end of the tool holder 7.

Helical springs 26 and 27 are arranged parallel to the axis of the tool holder 7. These helical springs 26 and 27 are secured on the one hand to the slide 18 and on the other hand to the legs 5 and 6 of the carrier 1, as shown. The helical springs 26 and 27 possess a pre-bias when the slide 18 impacts against the tool holder 7, so that the tool holder 7 is fixed in a force-locking manner. In order to release fixation of the tool holder 7 it is necessary to retract the slide 18 against the force exerted by the helical springs 26, 27. To this end, there can engage a nonillustrated mechanism at a bolt 28 protruding out of the rear end of the slide 18.

Furthermore, to release such fixation there is required a very short stroke of the slide 18, namely only to such extent until the conical countersunk bore 25 and the legs 23, 24 are no longer in engagement with the tool holder 7. This tool holder 7 then can be engaged by a non-illustrated gripper clamp engaging with the grooves 9, 10, 11 at the flange 8 and laterally moved away.

While there is shown and described present preferred embodiments of the invention, it is to be distinctly understood that the invention is not limited thereto but may be otherwise variously embodied and practiced within the scope of the following claims. Accordingly,

What is claimed is:

1. The combination of a holder mechanism equipped with a tool holder retained therein, a carrier provided for the holder mechanism, stop means arranged at the region of the carrier against which the tool holder is displaceable transverse to its axis, a locking element displaceably arranged at the carrier in the axial direction of the tool holder for locking the tool holder displaced against the stop means, a flange provided at the tool holder, said flange possessing diametrically oppositely situated recesses, said stop means comprising grooves provided at the periphery of the flange and retaining cams connected with the carrier, by means of which the tool holder is secured against displacement in axial direction, said locking element comprising a substantially U-shaped slide having a substantially conical-shaped countersunk bore, the tool holder having a rear end retained in said conical-shaped countersunk bore at the slide, said slide having legs engaging with said recesses.

2. The combination as defined in claim 1, wherein the carrier possesses a downwardly open U-shaped housing providing leg members, each leg member having an inside surface provided with a respective groove directed substantially parallel to the axis of the tool holder, said slide being guided at said grooves, and pre-biased spring means arranged between the slide and the carrier.

3. The combination of a holder mechanism equipped with a tool holder retained therein, a carrier provided for the holder mechanism, stop means arranged at the region of the carrier against which the tool holder is displaceable transverse to its lengthwise axis, a locking element displaceably arranged at the carrier in the axial direction of the tool holder for locking the tool holder displaced against the stop means, a flange provided at the tool holder, said flange possessing diametrically oppositely situated recesses, said stop means comprising grooves provided at the periphery of the flange and two retaining cams connected with the carrier and cooperating with said grooves, by means of which the tool holder is secured against displacement in axial direction, said locking element comprising a substantially U-shaped slide, said slide having legs engaging with said recesses.

4. The combination as defined in claim 3, wherein the carrier possesses a downwardly open U-shaped housing providing leg members, each leg member having an inside surface provided with a respective groove directed substantially parallel to the axis of the tool holder, said slide being guided at said grooves, and pre-biased spring means arranged between the slide and the carrier.

* * * * *